(12) United States Patent
Lawryshyn et al.

(10) Patent No.: US 10,807,882 B2
(45) Date of Patent: Oct. 20, 2020

(54) PROCESS AND DEVICE FOR THE TREATMENT OF A FLUID CONTAINING A CONTAMINANT

(71) Applicant: Trojan Technologies, London (CA)

(72) Inventors: Yuri Andrew Lawryshyn, Midhurst (CA); Tai Fung Tang, Toronto (CA); Domenico Santoro, London (CA); Siva Rajan Sarathy, London (CA)

(73) Assignee: TROJAN TECHNOLOGIES, London, ON (CA)

( * ) Notice: Subject to any disclaimer, the term of this patent is extended or adjusted under 35 U.S.C. 154(b) by 438 days.

(21) Appl. No.: 15/191,001

(22) Filed: Jun. 23, 2016

(65) Prior Publication Data

US 2016/0376166 A1    Dec. 29, 2016

Related U.S. Application Data

(60) Provisional application No. 62/231,029, filed on Jun. 23, 2015.

(51) Int. Cl.
*C02F 1/00*    (2006.01)
*C02F 1/68*    (2006.01)
(Continued)

(52) U.S. Cl.
CPC ........... *C02F 1/008* (2013.01); *C02F 1/32* (2013.01); *C02F 1/50* (2013.01); *C02F 1/685* (2013.01);
(Continued)

(58) Field of Classification Search
CPC ....... C02F 1/008; C02F 1/50; C02F 2209/005
See application file for complete search history.

(56) References Cited

U.S. PATENT DOCUMENTS 8,262,914 B2 * 9/2012 Mitzlaff ............... C02F 1/5209
210/103
8,580,121 B2 * 11/2013 Ladron de Guevara ...................
F17D 3/10
210/709
(Continued)

FOREIGN PATENT DOCUMENTS

CA    2122233 A1    10/1994
CA    2773298 A1    10/2012
(Continued)

OTHER PUBLICATIONS

International Search Report for PCT/CA2016/050737, dated Sep. 23, 2016, 5 pages, Quebec, Canada.

*Primary Examiner* — Ellen M McAvoy
(74) *Attorney, Agent, or Firm* — Ference & Associates LLC

(57) ABSTRACT

In one of its aspects, the invention relates to a process to optimize the dose of a treatment agent for the treatment of a fluid comprising a contaminant. In this first aspect the process comprises the steps of: (a) calculating the dose of the treatment agent based on the relationship between concentration of the treatment agent at one or more points and residence time distribution of the treatment system, and (b) contacting the fluid with the treatment agent in the concentration required to meet the dose calculated in step (a). In another one of its aspects, the invention relates to a process to optimize the dose of a treatment agent for reduction of a contaminant in a fluid.

21 Claims, 12 Drawing Sheets

Example of microbial response in wastewater.

(51) Int. Cl.
*C02F 1/32* (2006.01)
*C02F 1/50* (2006.01)

(52) U.S. Cl.
CPC .. *C02F 2209/003* (2013.01); *C02F 2209/005* (2013.01); *C02F 2209/44* (2013.01); *C02F 2303/04* (2013.01); *Y02W 10/37* (2015.05)

(56) References Cited

U.S. PATENT DOCUMENTS

| | | | | |
|---|---|---|---|---|
| 2005/0218082 | A1* | 10/2005 | Williamson | A61L 9/205 210/739 |
| 2008/0078719 | A1* | 4/2008 | Fabiyi | C02F 3/006 210/626 |
| 2009/0035180 | A1* | 2/2009 | Wan | C02F 1/008 422/62 |
| 2009/0226951 | A1* | 9/2009 | Ogawa | C12Q 1/02 435/29 |
| 2009/0277841 | A1* | 11/2009 | Johnson | F28F 19/00 210/668 |
| 2010/0204924 | A1* | 8/2010 | Wolfe | C02F 1/008 702/25 |
| 2010/0332149 | A1* | 12/2010 | Scholpp | C02F 1/008 702/25 |
| 2011/0068060 | A1* | 3/2011 | Hatten | C02F 1/008 210/739 |
| 2012/0211426 | A1* | 8/2012 | Santoro | B01F 5/0473 210/665 |
| 2012/0267318 | A1* | 10/2012 | Hatten | G05D 11/135 210/744 |
| 2013/0098844 | A1* | 4/2013 | Forstmeier | C02F 1/008 210/739 |
| 2014/0131285 | A1* | 5/2014 | Sichel | C02F 1/32 210/745 |
| 2015/0034552 | A1 | 2/2015 | Pickett et al. | |
| 2016/0122201 | A1* | 5/2016 | Gilmore | C02F 1/008 700/271 |
| 2016/0123882 | A1* | 5/2016 | Gilmore | G01N 21/645 250/227.11 |
| 2018/0265375 | A1* | 9/2018 | Sarathy | C02F 1/008 |

FOREIGN PATENT DOCUMENTS

| | | |
|---|---|---|
| CA | 2783825 A1 | 1/2013 |
| WO | 2009002192 A1 | 12/2008 |
| WO | 2009020709 A2 | 2/2009 |
| WO | 2009137636 A1 | 11/2009 |

* cited by examiner

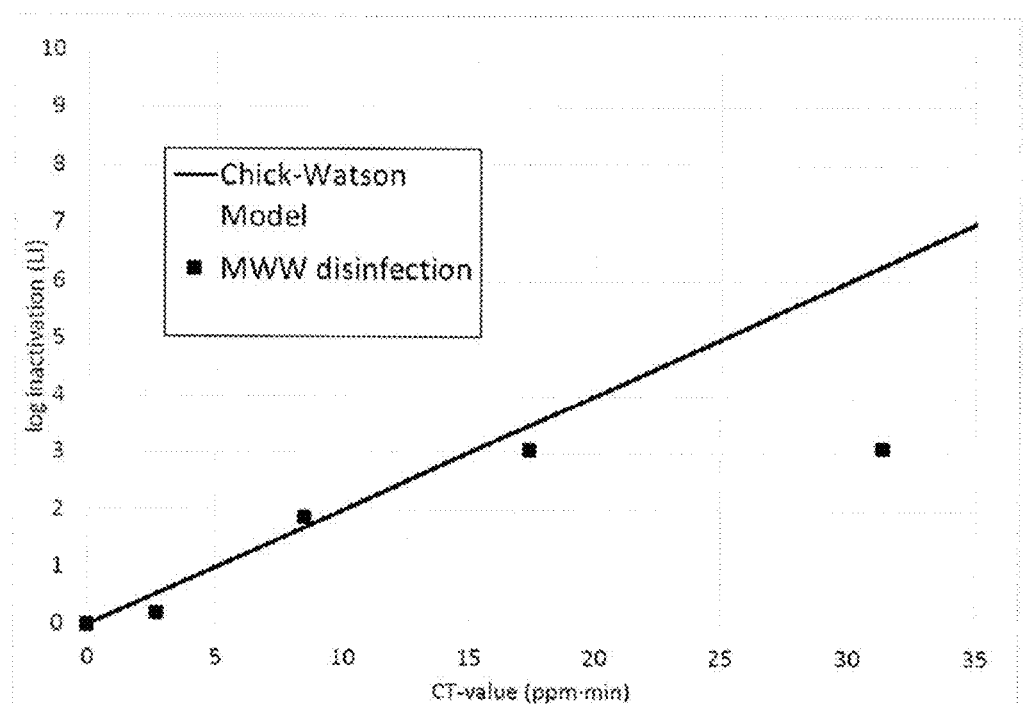
Figure 1. Example of microbial response in wastewater.

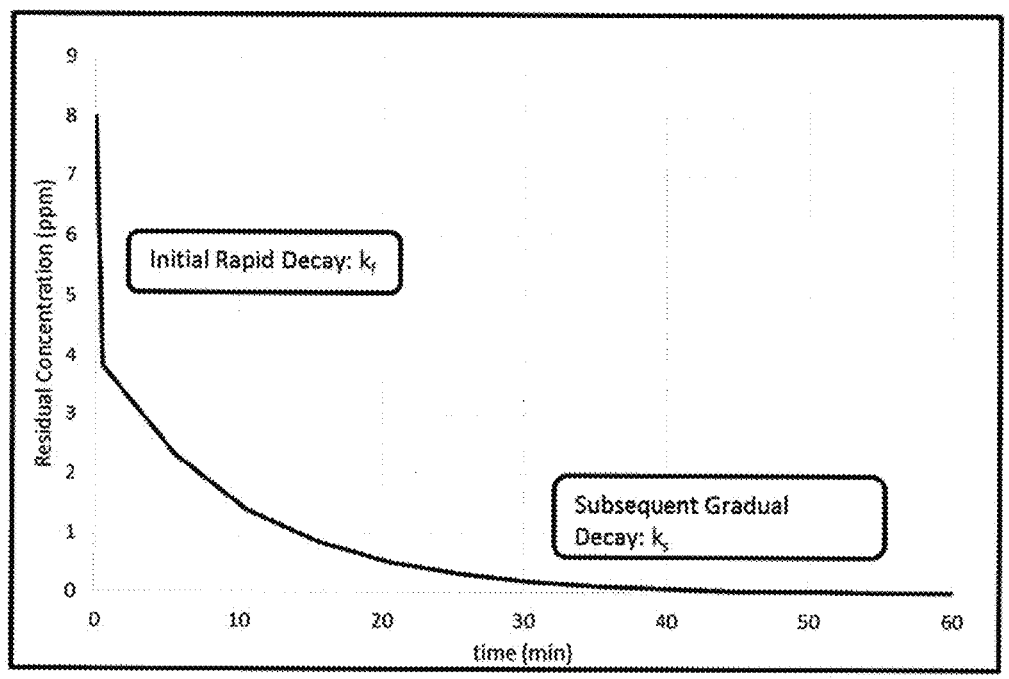
Figure 2. An example of PAA decay in a wastewater sample.

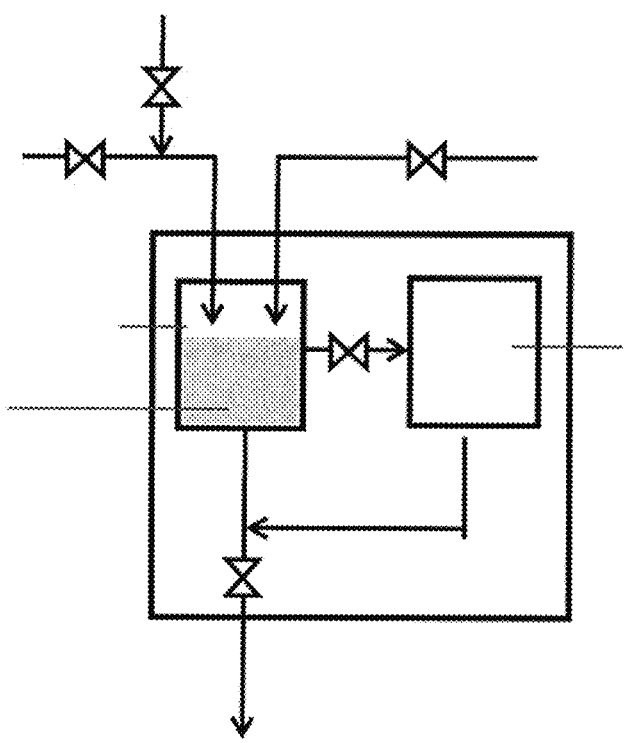
Figure 3 "Smart Box" for estimating demand/decay.

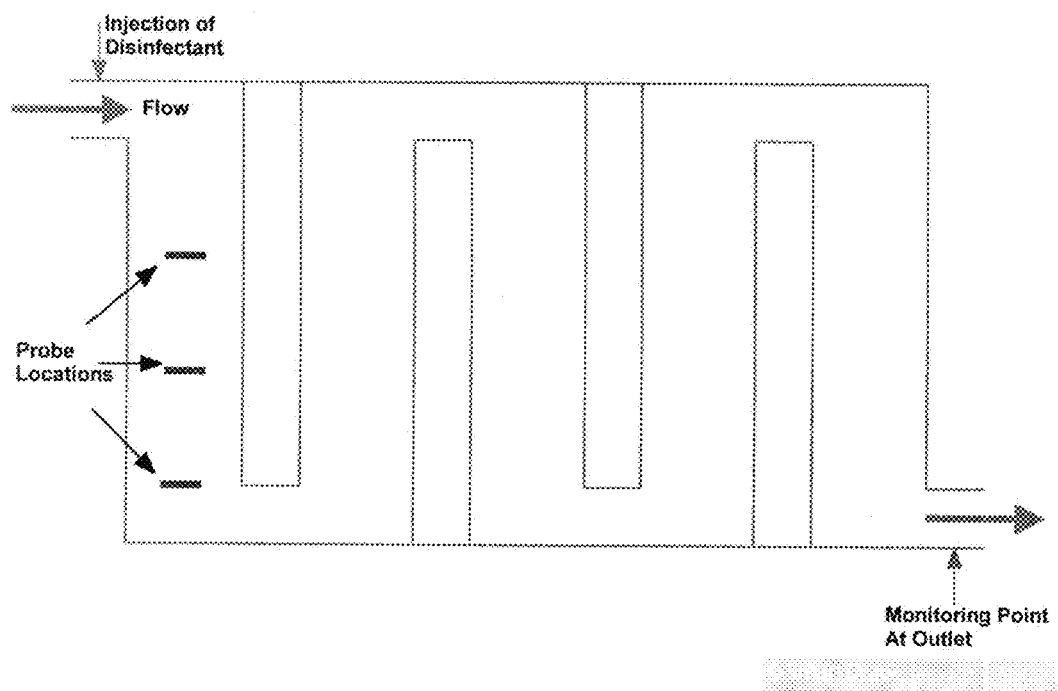
Figure 4. Disinfectant probe locations in a contact chamber.

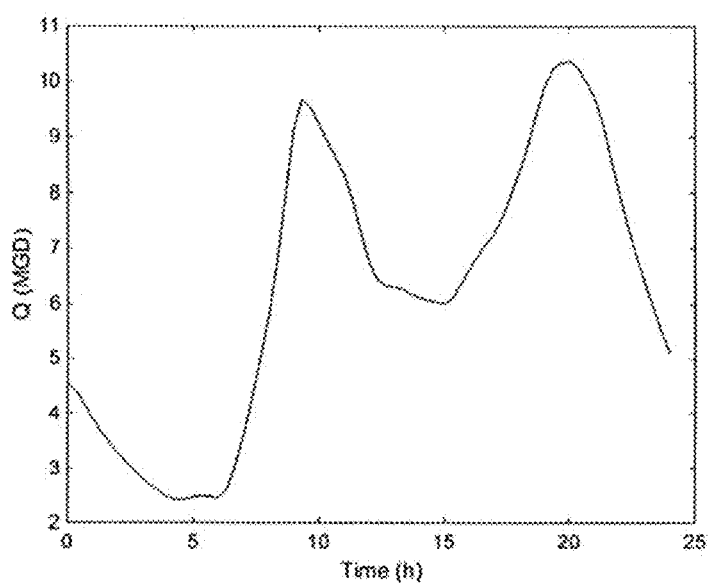
Figure 5. Diurnal flow pattern.

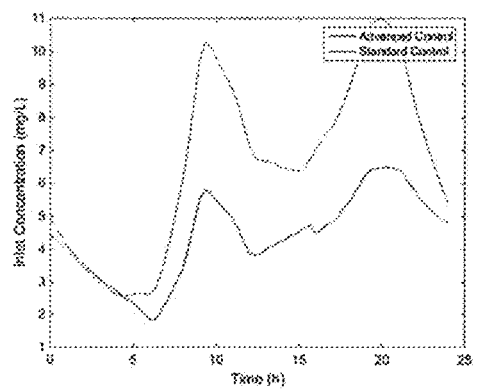
Figure 6. PAA Usage and Microbial Disinfection Performance for the Primary Wastewater Demand/Decay Parameters.
Total PAA usage ratio of the Simple Control to the Advanced Control = 1.51.

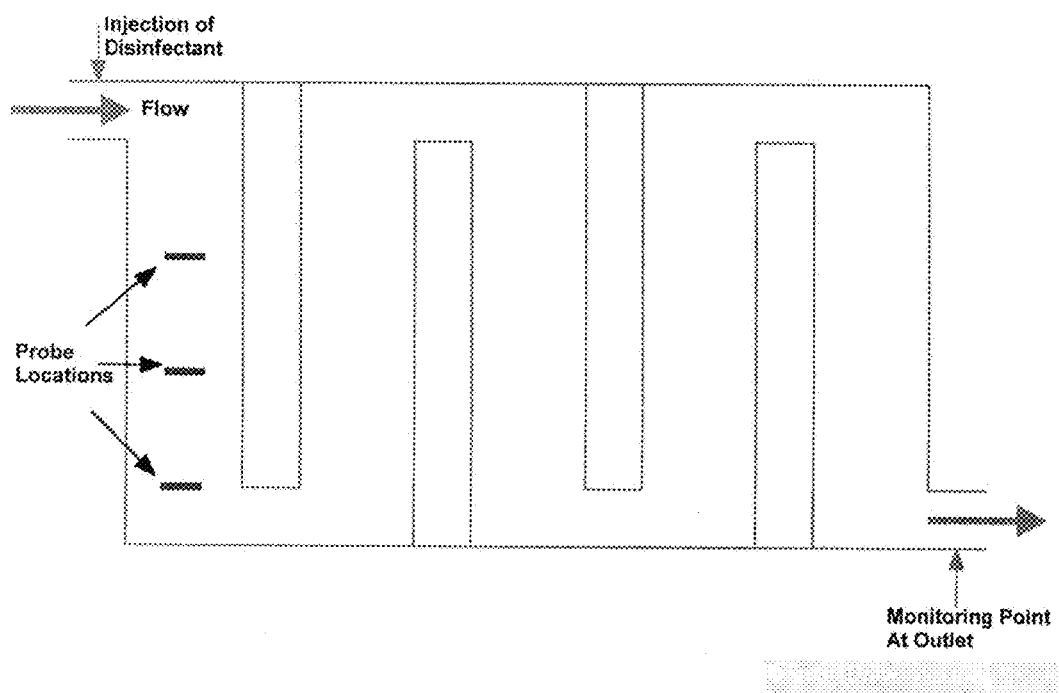
Figure 7. Disinfectant probe locations in a contact chamber.

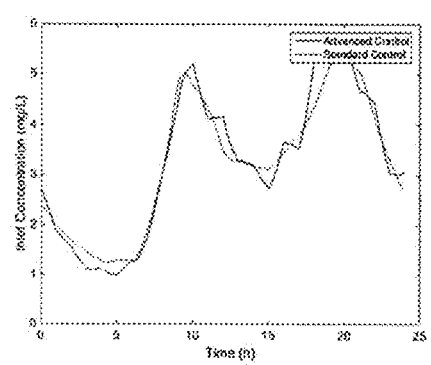
Figure 8. PAA Usage and Microbial Disinfection Performance for the Primary Wastewater Demand/decay Parameters with UV Disinfection. Total PAA usage ratio of the Simple Control to the Advanced Control = 1.13

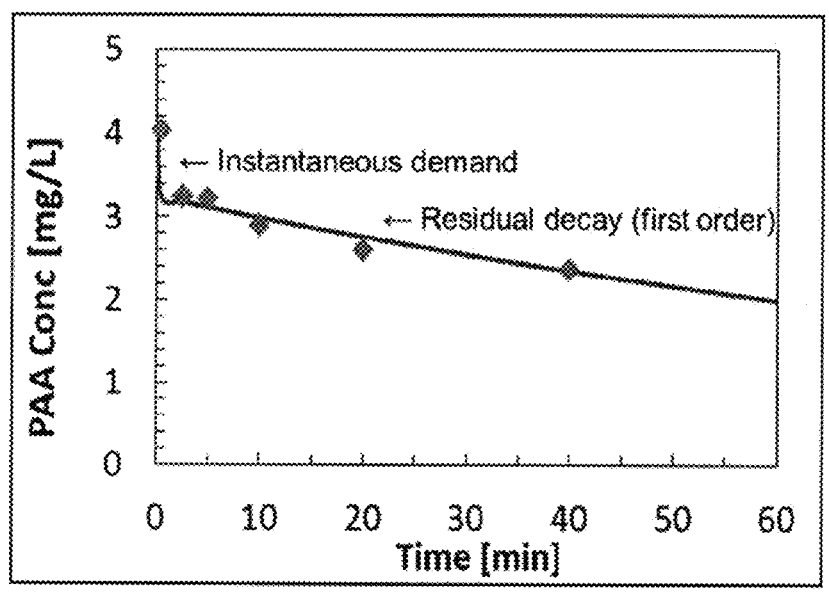
Figure 9. Sample plot of the residual PAA concentration over time.

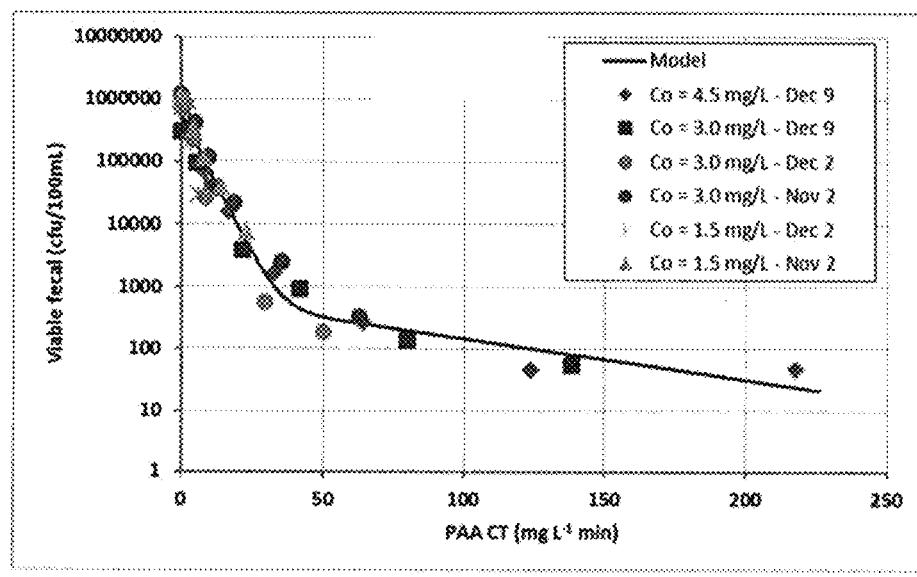
Figure 10. A sample plot of the viable fecal coliforms as a function of ICT.

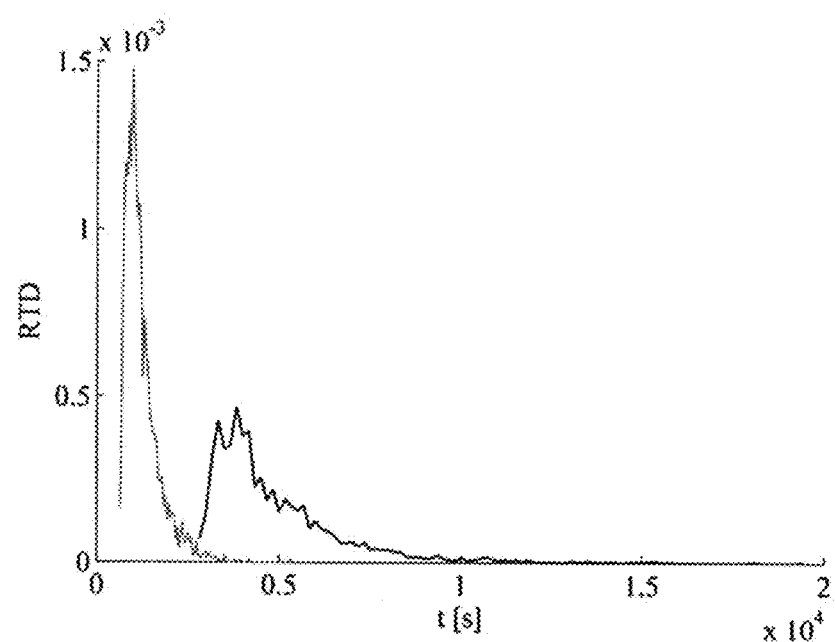
Figure 11. A sample plot of RTD of particles through the system.

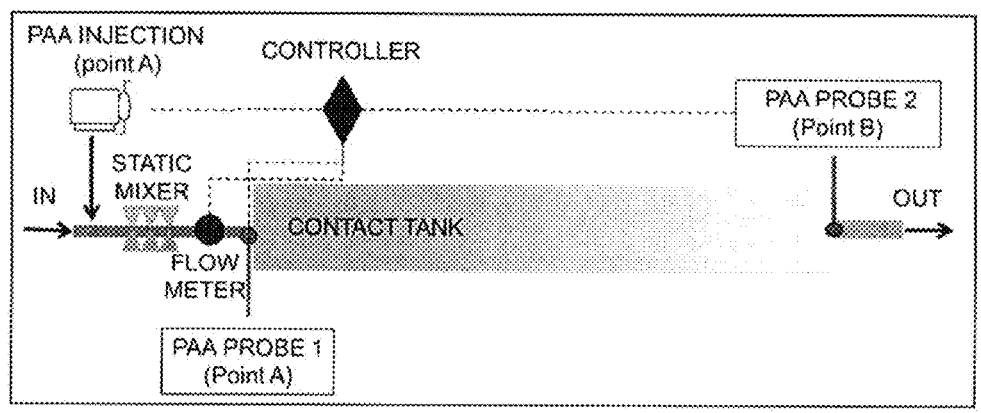
Figure 12. A schematic of the plant installation

PROCESS AND DEVICE FOR THE TREATMENT OF A FLUID CONTAINING A CONTAMINANT

CROSS REFERENCE TO RELATED APPLICATION

The present application claims the benefit under 35 U.S.C. § 119(e) of provisional patent application Ser. No. 62/231,029, filed Jun. 23, 2015, the contents of which are hereby incorporated by reference.

BACKGROUND OF THE INVENTION

Chemical disinfection is an essential component of water and wastewater treatment, and its effectiveness has been widely accepted since the introduction of chlorine disinfection for drinking water treatment in the late 1800's. When a suitable chemical is applied to water or wastewater with sufficient concentration and contact time (the product of these two factors defining the chemical disinfectant "dose"), chemical disinfection can effectively inactivate microorganisms and pathogens; thus protecting both consumers of water (i.e., public health) and the environment. However, high residual disinfectant concentration in the treated water and wastewater effluent can have adverse effects (via the formation of undesired disinfection byproducts) and adds unnecessary costs to treatment plant operation for quenching the disinfectant. Conversely, under-dosing can lead to low disinfection levels, which may result in outbreaks of disease and may detrimentally impact the environment. Hence, the design and operation of chemical disinfectant dose control for municipal water and wastewater treatment applications has been an important and ongoing research topic and its optimization will continue to be an evolving process (Bellamy, W. D., et al., 1998).

In the mid-1980s the USEPA was tasked by Congress to revise regulations in accordance with the Safe Drinking Water Act Amendments and standardize potable water treatment from the aspect of pathogen removal and disinfection (Bellamy, W. D., et al., 1998). As part of this work emerged the "Surface Water Treatment Rule" (SWTR) and a key aspect of the rule was that disinfection credit was awarded based on the "CT" concept, where CT is defined as the residual disinfectant concentration times the contact time (i.e., the chemical disinfectant dose). The CT concept has been widely adopted in both water and wastewater chemical disinfection treatment. It is accepted that after accounting for the demand/decay of the chemical disinfectant, CT is a good predictor of the disinfectability of a given target pathogen.

More in general, the fact that fluid treatment processes are governed by the product of a main variable (usually the concentration of a treatment agent) and time is not new. As mentioned before, it is widely recognized that chemical disinfection processes are governed by the concept of "chemical disinfectant dose" (equivalent to CT concept as discussed above); the product between disinfectant concentration and contact time. Similarly, advanced oxidation processes are governed by hydroxyl radical exposure, i.e., the product of hydroxyl radical concentration and contact time. Another example can be found in the field of coagulation/flocculation/settling processes, where the various stages are governed by dimensionless number GT, that is, the product of the velocity gradient G (or mixing intensity) and the contact time T. By extension, it could be argued that all the processes falling in the categories of pre-treatment, primary treatment, secondary treatment, tertiary treatment and advanced treatment of a contaminated fluid are governed not only by the reaction rate (usually related to treatment agents' concentrations) but also by contact time (which, in continuous flow reactor, takes the more complex form of residence time distribution/reactor hydrodynamics).

As highlighted in (Bellamy, W. D., et al., 1998), the main aspects of ensuring effective disinfection are a good understanding of 1) microbial disinfection kinetics, 2) disinfectant demand/decay and 3) contact reactor (contact chamber) hydraulics. Thus, if one understands the treatment requirements, i.e., the target CT, then a system that can accurately predict the treatment agent demand/decay integrated with an accurate model of the reactor hydraulics, which then provides the residence time distribution (RTD) of the system leading to an accurate calculation for CT, will allow for the optimal control of treatment agent dosing. The present invention is based on a novel method to optimally and dynamically control the treatment agent CT dose by accounting for the online measurement of the disinfectant demand/decay and coupling the demand/decay kinetics with a model of the hydraulics of the contact reactor to account for the residence time distribution (RTD). Residence Time Distribution (RTD) of a chemical reactor is a probability distribution function that describes the amount of time a fluid element resides inside the reactor. The CT set-point can be varied dynamically over time and over space by linking the latter to additional water quality measurements such as microbial counts, optical properties, chemical properties, physical properties, and so on. The following paragraphs will discuss, in more detail, prior work associated with the modeling of microbial disinfection, disinfectant demand/decay, reactor performance, and reactor control.

Microbial Disinfection

Irrespective of their nature (i.e., whether they are promoted by a chemical, a biological, or a physical treatment agent, or a combination thereof), the effectiveness of treatment processes in purifying a contaminated fluid (i.e., a liquid, a gaseous or a solid stream carrying one or more undesired compounds) depend on the treatment agents used in the processes and their treatment kinetics, which can be generally expressed in terms of mechanistic or empirical rate of reactions as follows:

$$\frac{dN}{dt} = f(N, A, B, C, \ldots) \quad (1)$$

where N is a generic contaminant to be treated, and A, B, C, etc. are the generic treating agents promoting the treatment process.

Recent studies by a number of authors ((Hassen, 2000), (Koivunen, J. & Heinonen-Tanski, H., 2005), (Mezzanotte, 2003)) have found that conventional drinking water disinfection models do not accurately predict disinfection in wastewater. For example, the standard Chick-Watson model, expressed as:

$$LI = -\log\left(\frac{N}{N_0}\right) = \Lambda \cdot CT \quad (2)$$

where LI is the log in activation (i.e., the log in influent microbial counts/concentration in effluent microbial counts) and $\Lambda$ is the organism sensitivity, cannot account for the nonlinear response typically observed in wastewater. An example that compares the Chick- Watson model to the actual log inactivation of a pathogen (fecal coliform) in a wastewater sample exposed to a disinfectant (PAA) is shown in FIG. 1. A general model that accounts for the nonlinearity and has been utilized in a number of wastewater disinfection applications is a second order microbial dose response model of the form:

$$\frac{N}{N_0} = (1-\beta)e^{-k_f CT} + \beta_{PAA} e^{-k_s CT}, \qquad (3)$$

where $\beta$, $k_f$ and $k_s$ are coefficients that can be estimated based on fitting experimental data.

Chemical Demand/Decay

As discussed in (Bellamy, W. D., et al., 1998), a disinfectant will decay when added to water, reducing the disinfectant's effectiveness. An example of PAA decay in a wastewater sample is shown in FIG. 2. Studies ((Sohn, J., et al., 2004) and (Rauen, W. B., et al., 2008)) suggest that although it is impossible to identify the numerous species and reaction mechanisms that consume the disinfectant species, C, the numerous unknown species can be generalized as scavenger chemicals, S, which consume the chemical disinfectant. It has been proposed that the overall reaction consists of two pseudo first order kinetic pathways that take place simultaneously. The first pathway describes the initial rapid decay of the disinfectant, as expressed by:

$$C_f + S \rightarrow C_f S, \qquad (4)$$

where $C_f$ is the rapidly consumed disinfectant and S is the scavenger species. The second pathway describes the subsequent gradual decay of the disinfectant and is given by:

$$C_s + S \rightarrow C_s S, \qquad (5)$$

where $C_s$ is the gradually consumed disinfectant. As proposed by the aforementioned literature, the total chemical disinfectant concentration, C, is calculated as the sum of the concentrations of the rapidly and gradually consumed chemical disinfectants, $$C = C_f + C_s. \qquad (6)$$

then, by letting α be the fraction of the gradually consumed concentration of C, $C_f$ and $C_s$ are given by:

$$C_f = (1-\alpha) \cdot C \qquad (7)$$

$$C_s = \alpha \cdot C. \qquad (8)$$

The model assumes that the concentration of scavenger species that consumes $C_f$ and $C_s$ is abundant throughout the course of the process. Thus, the decays of $C_f$ and $C_s$ are expressed by the first order reaction equations:

$$C_f(t) = C_{f0} e^{-k_f t} \qquad (9)$$

and $$C_s(t) = C_{s0} e^{-k_s t} \qquad (10)$$

where $C_{f0}$ and $C_{s0}$ are respectively the initial concentrations of rapidly consumed and gradually consumed disinfectant concentrations; $k_f$ and $k_s$ are respectively their pseudo first order kinetic rate constants. By substituting equations (9) and (10) into equation (6), the decay of chemical disinfectant is given by:

$$C(t) = C_{f0} e^{-k_f t} + C_{s0} e^{-k_s t}. \qquad (11)$$

Based on equation (7) and (8), $C_{f0}$ and $C_{s0}$ can then be expressed by $C_0$ and α. Hence, the final form of the chemical disinfectant decay model is expressed as follows:

$$C(t) = (1-\alpha) C_0 e^{-k_f t} + \alpha C_0 e^{-k_s t}, \qquad (12)$$

where the disinfectant concentration, C, is a function of time and dependent on three process condition parameters: the initial chemical dose, $C_0$, and chemical decay rate constants, $k_f$ and $k_s$. The CT can be calculated by integrating equation (12) with time, $$CT(t) = \frac{(1-\alpha)C_0}{k_f}(1 - e^{-k_f t}) + \frac{\alpha C_0}{k_s}(1 - e^{-k_s t}). \qquad (13)$$

By understanding the reactor hydrodynamics, the particle-specific residence time, or residence time distribution, of a given contact reactor, equation (13) can be used to accurately predict (and control) the disinfection performance of the system.

Reactor Modeling

A key aspect of understanding system performance is an estimate of the residence time distribution (RTD). Tracer studies have traditionally been utilized to characterize the hydraulics of disinfection reactors (Bellamy, W. D., et al., 1998). A simple axial dispersion model is available in many textbooks (Levenspiel, 1972) and is discussed in further detail in the Summary of Invention section.

Computational Fluid Dynamics (CFD) modeling has also been used extensively to model disinfection reactors. Researchers have predominantly used Eulerian CFD simulations to model chemical disinfection processes and produced accurate results that are comparable to the experimentally measured hydraulic conditions from tracer studies of disinfectant contact reactors. Eularian CFD is a model that tracks the changes of parameters in each coordinate of the model geometry. Amini, R., et al., 2011, Rauen, W. B., et al., 2008 and Khan, L. A., et al., 2006 have simulated the transport of an inert species in their CFD models. By comparing their CFD tracer simulation results with pilot scale experimental data, they have concluded that CFD is a suitable simulation tool to characterize the fluid dynamic conditions of their pilot disinfectant contact chambers. Their simulation results have provided information on the residence time distribution (RTD), degree of mixing, degree of short circuiting, and identified stagnant flow regions. By determining the process discrepancy from ideal plug flow conditions, CFD simulation can assist in the optimization of the contact chamber hydraulic design. An example of an industry application of an Eulerian CFD simulation can be found in (Zhang, J., et al., 2011), in which a municipal drinking water service tank in Singapore was simulated and the model produced accurate residence time distribution predictions when compared to a field tracer study. However, (Angeloudis, A., et al., 2015) and (Rauen, W. B., et al., 2012) have pointed out that hydraulic information, alone, cannot directly predict the disinfectant residual concentration or the disinfection performance of a chemical disinfection process. More recent studies, including (Angeloudis, A., et al., 2015), (Rauen, W. B., et al., 2012), and (Zhang, J., et al., 2011), have started to incorporate disinfectant demand/decay and pathogen disinfection models into the Eulerian framework to directly assess chemical disinfection process performance, yet there have not been any works attempting to implement the Eulerian CFD models for chemical disinfection processes control. Excessively high computational demand might have been the limiting factor. (Khan, L. A., et al., 2006) have reported that the hydraulic performance simulation of the pilot unit from (Shiono, K. & Teixeira, E., 2000) using an Eulerian CFD model, with a 1.7 GHz CPU and 2 Gb memory computer, required simulation times ranging from 2.23 hr to 1297 hr, depending on the CFD mesh density. Similarly, (Zhang, J., et al., 2011) have reported a simulation time of 82 hr to resolve both the flow and chlorine concentration within the service tank model geometry. The long processing time associated with Eulerian CFD simulations makes it impractical for online process control.

Conversely, researchers have predominantly implemented the Lagrangian framework to simulate UV disinfection process performance. Lagrangian CFD modelling of UV disinfection has been utilized for online control. (Lawryshyn, Y. & Cairns, B., 2003) proposed utilizing Lagrangian particle tracks to develop a CFD-based control algorithm, which has been patented (U.S. Pat. Nos. 6,564,157, 7,031, 849). It stores the residence time and spatial information of pre-generated Lagrangian particle tracks and uses them as inputs to UV intensity and a disinfection model to calculate the UV dose and disinfection level of each particle. Hence, the reactor can be controlled by predicting disinfection performance using the particle track data and controlling UV-lamp output to achieve the required UV dose set-point. One disadvantage of the technology (U.S. Pat. Nos. 6,564, 157, 7,031,849) is it requires a significant amount of computer memory and while the methodology is applicable for manufactured reactors, where the geometry is consistent, it would be cumbersome to implement such a technology on a constructed reactor, where, for each application, the geometry would need to be modeled using CFD.

A thorough search of the literature has found no practical models that allow for a change in the RTD curves, as a function of time, for varying, unsteady flow rates. In the preferred embodiment of the present invention, the simple axial dispersion model has been utilized to avoid the aforementioned issues with memory storage and site-specific CFD modeling. However, the model and associated feedforward control algorithm has been enhanced to allow for varying inlet conditions associated with flow rate and water quality (including disinfectant demand/decay and microbial disinfection). Thus, in the current embodiment, the control algorithm requires the adjustment of only a few parameters to account for site-specific hydraulics and disinfectant demand/decay conditions, and is capable of dealing with the time varying dynamics of the system.

Reactor Control

The current practice in most chemical processing applications is to use sensors and probes throughout the process stream to control the system. Generally, PID control algorithms are used. A PID controller calculates an error value as the difference between a measured process variable and a desired set-point. The controller attempts to minimize the error by adjusting the process through use of a manipulated variable. Numerous examples of such a strategy can be referenced for water and wastewater treatment, such as: (a) pre-treatment processes for odor control where a treating agent is added to remove odor-generating compounds such as H2S; (b) primary treatment processes where a treating agent is added to increase the size and concentration of the particulate contained in the fluid; (c) secondary treatment processes where the oxygen or nutrients or water quality characteristics (pH, redox, etc.) are controlled to guarantee the desired anoxic, anaerobic or aerobic conditions within the fluid; (d) secondary treatment processes where a treating agent such as oxygen or nutrient are controlled to guarantee the desired anoxic, anaerobic or aerobic conditions within the fluid; (e) tertiary treatment processes where one or more treating agents such as a chemical disinfectant are controlled to guarantee the desired disinfection credits (CT credits) before the fluid is discharged; (f) advanced treatment processes where one or more treating agents such as a catalyst are controlled to guarantee the desired oxidation level before the fluid is discharged; (g) downstream treatment processes where one or more treating agents are controlled to guarantee the desired level of removal of emerging contaminants, taste & odor generating contaminants and invasive species before the fluid is discharged or reused.

Municipal wastewater chemical disinfection processes with long contact times, unlike most chemical engineering processes, are difficult to control using conventional PID (Proportional-Integral-Derivative) control. (Demir, F. & Woo, W. W., 2014), (Shen, W., et al., 2009), and (Chien, I.-l., et al., 2002) have identified long dead time as the main contributing factor to the incapability of controlling the process with conventional PID control. A typical chemical disinfection contact chamber can have a residence time between 15 to 40 minutes; this forms a long dead time between the feedback signal and the control input. These studies have also suggested that unsteady stochastic conditions such as flowrate, disinfectant decay, and disinfectability cannot be accounted for with such long dead times. Thus, the combined effects of long dead time and the unsteady stochastic process conditions have rendered the feedback signal to be not representative of the process response to the applied chemical dose, thus reducing the efficacy of PID control. It should be emphasized, however, that while advanced PID control may be the current state of the art for chemical disinfection of reactor contactors with long lead times, most plants operate by using a constant chemical dose or by adjusting the chemical dose for flow rate (dose pacing) only. Specifically, current methods for disinfection process control are:

1) Dosing the disinfectant at a constant injection rate irrespective of flowrate, effective CT dose, reactor hydrodynamics, residual disinfectant concentration, microbial inactivation kinetics, disinfectant demand and decay kinetics, and/or wastewater quality;
2) Dosing the disinfectant at an injection rate proportional to flow (flow pacing) to keep a theoretical initial concentration constant, irrespective of effective CT dose, reactor hydrodynamics, residual disinfectant concentration, microbial inactivation kinetics, disinfectant demand and decay kinetics, and/or wastewater quality;
3) Dosing the disinfectant at an injection rate proportional to flow (flow pacing) to keep a theoretical initial concentration constant and a residual disinfectant concentration at the reactor outlet close to a desired target, irrespective of effective CT dose, reactor hydrodynamics, microbial inactivation kinetics, disinfectant demand and decay kinetics, and/or wastewater quality; and
4) Dosing the disinfectant at an injection rate proportional to flow (flow pacing) to keep a theoretical initial concentration constant and a residual disinfectant concentration at the onset of the reactor close to a desired target, irrespective of effective CT dose, reactor hydrodynamics, microbial inactivation kinetics, disinfectant demand and decay kinetics, and/or wastewater quality.

Two advanced approaches have been suggested in the literature to properly control municipal wastewater disinfection processes. (Demir, F. & Woo, W. W., 2014) and (Chien, I.-l., et al., 2002) have incorporated the Smith Predictor into the feedback loop of the PID control to compensate for the long dead time. Alternatively, (Shen, W., et al., 2009) and (Muslim, A., et al., 2009) have proposed the use of feedforward controls to avoid the need to account for the process dead time. Feedforward controls are predictive models utilized to meet multiple output targets by accounting for multiple input disturbances. Although both feedback and feedforward strategies have reported good control performance, they only account for the input and output parameters of a disinfection process and ignored the fluid dynamics, chemistry, and disinfection kinetics that are the fundamental mechanisms of wastewater disinfection.

As already discussed, to optimally control the required disinfectant dose, both system hydraulics and disinfectant demand/decay play a key role. In the present invention a number of different strategies are considered for the online measurement of demand/decay. Online instrumentation for the purpose of measuring disinfectant demand/decay has been presented previously. (Kim, et al., 2007) developed an online instrument to measure ozone demand/decay. Their method comprises similar principles as the present invention in that a portion of the water to be disinfected is dosed with the disinfectant and based on known residence times within the instrument the demand/decay can be measured. However, their work did not provide any details on how the demand/decay model would then be utilized with online control. Furthermore, while the present invention can be used with ozone treatment, ozone contact times are generally significantly lower than other disinfectants (e.g., chlorine, PAA). Standard PID control may work effectively with ozone treatment, but the long dead times associated with other disinfectants requires further optimization, as will be achieved with the current invention.

A number of patents have been issued that utilize online instrumentation and control. For example, U.S. Pat. No. 5,736,004 (1998) consists of a process control method for adjusting chemical application in response to the pulp brightness and/or lignin content by utilizing a coupled control feedforward, feedback or combination feedforward/feedback control system, wherein brightness measurements are made between successive lignin content measurements and adjustments are made to the chemical application in response to a comparison value. The claims in this patent are only related to chemical pulp processing. U.S. Pat. No. 6,129,104 (2000) is an invention for a method for controlling the addition of liquid treatment chemicals by automatic dose control. The control is based on flow rate and chemical concentration measurements and computations done by a controller. In US20110049061 (2011), a method of treating wastewater to remove odorous sulfide compounds is presented. The claims in this invention center solely on sulfur detection. US20120211417 (2012) presents a process for optimizing carbon feed in a denitrification filter. The process utilizes in-line or off-line measurements of process variables in combination with feed forward and feedback control to calculate the amount of carbon to be added to the system. While all of these inventions employ control algorithms that utilize online measurement(s) of process variables (flow rate, chemical concentrations, etc.), none of the methods/algorithms explicitly incorporate time in an integrated fashion with treatment agent concentrations or employ residence time distribution (RTD) within their control strategy. In all cases, the simple "plug flow" assumption is made, implicitly or explicitly. A key aspect of the current invention is that system (reactor) hydraulics, through the use of the RTD, are incorporated into the control. The invention is further enhanced by accounting for changes in the RTD based on varying flow rate. These features allow for a robust dynamic controller capable of dealing with fluctuating conditions within the system.

As is evident from the preceding discussion, no method exists in the prior-art for moderating the treatment agent injection rate to control the effective CT dose as a function of treatment agent demand/decay and reactor hydrodynamics (RTD). This is due to the fact that developing such a methodology requires an inventive step which goes beyond the commonly available knowledge in the field. The lack of such a method is also confirmed by the available technical literature on disinfection process design and operations, where standard methods have been proposed to pre-calculate the disinfection credits (CT credits) without taking into account the possibility of controlling them in real time as a function of reactor hydrodynamics (or residence time distribution), residual disinfectant concentration, microbial inactivation kinetics, disinfectant decay kinetics, wastewater quality. Needless to say that the lack of such a methodology leads to the use of safety factors to compensate for uncertainties.

Our invention is believed to enable the measurement, monitoring and control of the real time CT credits (i.e., the chemical disinfectant dose) attainable in any arbitrary reactor as a function of measured or calculated treatment agent demand/decay kinetics and reactor hydrodynamics (residence time distribution). As illustrated before, the proposed methodology can easily be extended to the control and optimization of other treatment processes governed by the interaction between rate-governing variables (typically proportional to treatment agents' concentrations) and the reactor hydrodynamics (typically illustrated by local or global residence time distributions), such as pre-treatment, primary treatment, secondary treatment and tertiary treatment of contaminated gaseous, liquid and solid fluids in addition to industrial treatment processes such as process water, produced water, condensates and cooling water.

SUMMARY OF INVENTION

It is an object of the present invention to obviate or mitigate at least one of the abovementioned disadvantages of the prior art.

It is another object of the present invention to provide a novel process to accurately predict and control the performance of a fluid treatment system by utilizing the specific parameters of the fluid treatment system hydrodynamics or residence time distribution (RTD).

It is another object of the present invention to provide a novel process to calculate and control the dose of one or more treatment agent by integrating models for the chemical demand/decay kinetics of one or more treatment agent and fluid treatment system hydrodynamics or residence time distribution (RTD).

It is another object of the present invention to provide a novel process to optimally and dynamically control the dose of a treatment agent by measuring the demand/decay of a treatment agent and coupling the demand/decay kinetics of the treatment agent with a model of the fluid treatment system hydrodynamics or residence time distribution.

It is another object of the present invention to provide a novel system to reduce the concentration of a contaminant in a fluid using a process to calculate and control the dose of a treatment agent by integrating models for the chemical demand/decay kinetics of a treatment agent and fluid treatment system hydrodynamics or residence time distribution (RTD).

It is another object of the present invention to provide a novel device to calculate dose of a treatment agent by integrating models for the chemical demand/decay kinetics of a treatment agent and fluid treatment system hydrodynamics or residence time distribution (RTD).

It is another object of the present invention to provide a novel device to calculate the dose of a treatment agent by measuring the demand/decay of a treatment agent and coupling the demand/decay kinetics of the treatment agent with a model of the fluid treatment system hydrodynamics or residence time distribution.

Accordingly, in one of its aspects the present invention provides for a process to optimize the dose of a treatment agent for the treatment of a fluid comprising a contaminant, the process comprising calculating the dose of the treatment agent based on the relationship between concentration of the treatment agent at one or more points and residence time distribution of the treatment system, and contacting the fluid with the treatment agent in the concentration required to meet the calculated dose.

Accordingly, in yet another one of its aspects, the present invention provides for a process to optimize the dose of a treatment agent for reduction of a contaminant in a fluid, the process comprising: calculating the residence time distribution (RTD) model for the treatment system, calculating one or more demand/decay models for the treatment system, calculating the dose model using the calculated RTD model from step (b) and the demand/decay model from step (c), calculating the dose of the treatment agent within the system using the dose model from step (d), contacting the fluid with the treatment agent in the concentration required to meet the dose calculated in step (d).

These process aspects of the invention are preferably cared out on computer hardware containing coded instructions to carry out the prescribed calculations. Such coding is believed to be routine for a computer programmer having in hand the present specification.

Embodiments of this aspect of the invention any of the following features, alone or in any combination:

The treatment system is a batch process.
The treatment system is a continuous flow process.
The treatment system is an arbitrary-flow process
The treatment system is a semi-batch or semi-continuous flow process.
The calculation of dose is continuous.
The calculation of dose is discrete.
The dose of a treatment agent is optimized for the treatment of the fluid.
The dose of a treatment agent is optimized to achieve a specified residual concentration of the treatment agent.
The dose of a treatment agent is optimized to achieve a specified reduction in the concentration of the contaminant.
The dose of a treatment agent is optimized to achieve a target value of one or more fluid properties
The dose of a treatment agent is optimized to achieve a target value of one or more fluid properties, wherein the target values are determined in a probabilistic framework.
The dose of a treatment agent is optimized to be delivered in one or more treatment steps (i.e., using single or multiple chemical dosing points in series, or in parallel, or in combination)
The fluid is a vapor.
The fluid is a gas.
The fluid is a liquid (e.g., a solution, a slurry, a colloidal suspension and the like).
The fluid contains an entrained solid (granular medium, etc.).
The fluid is aqueous liquid.
The fluid is selected from the group consisting of groundwater, leachate, wastewater, sewer water, black-water, graywater, bilge water, ballast water, feed water, process water, industrial water, irrigation water, recreational water, pond water, lake water, creek water, river water, rain water, runoff water, pool water, cooling water, non-potable water, surface water, potable water, drinking water, semi-pure water, spent ultrapure water, produced water and any mixture of two or more of these.
The contaminant is a biological, chemical or physical compound.
The contaminant is an organism.
The contaminant is a microorganism.
The contaminant is a chemical compound.
The contaminant is a chemical compound selected from the group including: personal care products, pesticides, pharmaceutical compounds, nutrient compounds, chemical oxygen demanding compounds, biochemical oxygen demanding compounds, nitrogen compound, phosphorus compounds, potassium compounds, sulfur compounds, etc. or any combination thereof.
The contaminant consists of one or more chemical compounds or one or more biological constituents or a combination of both.
The treatment agent is physical, mechanical, biological, chemical or any combination thereof.
The chemical treatment agent is selected from the group consisting of peracetic acid (PAA), chlorine, chloramine, chlorine dioxide, chlorite, ozone, performic acid, permanganate, persulfate, hydrogen peroxide, fenton reagents, ferric and/or ferrous based compounds, alum based compounds, polymer coagulants and flocculants, free nitrous acid, and any combination thereof.
At least one fluid property is measured.
The at least one fluid property is selected from the group consisting of fluid flow rate, concentration of a chemical agent, electrical conductivity, total organic carbon (toc), concentration of solids in the fluid, ultra-violet light transmittance (uvt), particle size distribution, ionic chromatography, total suspended solids, turbidity, ph, temperature, redox agent, dissolved oxygen, FTIR, UV-vis spectrometer, or any combination thereof.
The fluid property is measured online in real-time.
The fluid property is measured at discrete time intervals.
The fluid property is measured in one or more positions in the treatment system.
The fluid property is measured in a side stream or position outside of the treatment system.
The chemical concentration is measured at one or more positions in the system.
The water quality parameters are measured at one or more positions in the system.
The RTD model is assumed.
The RTD is based on an analytically generated equation.
A piece-wise linear, or other form of interpolation is used to generate the RTD.
The RTD is based on an equation generated using computational fluid dynamics (CFD) or other numerical approximation method.
The RTD is based on a vector of values generated using computational fluid dynamics (CFD) or other numerical approximation method.
The RTD is based on an empirically generated equation.

The process where the RTD is based on an empirically generated equation based on data collected during commissioning of the treatment system, real time data, historical data, etc.

The RTD is based on an empirically generated vector of values based on data collected during commissioning of the treatment system, real time data, historical data, etc.

The RTD is based on one or more of the following equations where x is a position within the treatment system measured as the average linear distance from the inlet (where chemical dosing is taking place) to the position where the RTD is being calculated, t is the time, u is the (average) velocity, V is the volume of fluid within the reactor from the inlet to location x, Q is the flow rate, D is a parameter based on experimental or numerical measurements or is estimated:

$$RTD = \frac{V}{Q}$$

or $$RTD = \frac{(x+tu)e^{-\frac{(x-tu)^2}{4Dt}}}{4\sqrt{\pi Dt^3}}$$

The RTD is obtained via Lagrangian or Eulerian flow modeling.

The RTD is obtained using meshless CFD methods.

The demand/decay is measured online.

The demand/decay model is based on one or more fluid parameters.

The demand/decay model is based on one or more parameters selected from flow rate, average velocity, RTD, position within reactor, diffusion coefficient, demand, decay, initial concentration, average residence time, UVT, turbidity, pH, particle count, organics, TSS.

The demand/decay model is based one or more of the following equations:

$$\frac{C}{C_0} = (1-\alpha)e^{-k_{f_D}t} + e^{-k_{s_D}t}$$

where C is the concentration of the disinfectant at time t, $C_0$ is the initial concentration and $\alpha \in [0,1]$, $k_{f_D} \geq 0$ and $k_{s_D} \geq 0$ are parameters that can be determined by experiments;

$$\frac{C}{C_0} = \kappa e^{-k_D t}$$

where $\kappa \in [0,1]$ and $k_D \geq 0$ are parameters that can be determined by experiments.

A piece-wise linear or some other form of interpolation is used to generate the demand/decay model.

Numerical methods are used to estimate parameters for a given demand/decay model.

A fitting algorithm is used to estimate the parameters for the demand/decay model.

The dose model is based on a demand/decay equation.

The dose model is based on the RTD calculated using any one of the previous methods.

The dose model is generated by an analytical model.

The dose model is generated by computational fluid dynamics or other numerical approximation method.

The dose model is created by integrating the demand/decay model with the RTD model.

The dose model is created using online estimation of demand/decay.

Chemical dose utilizes a dose model and standard PID control.

The dose of the treatment agent is calculated to meet a specified CT value at one or more locations in the system.

The specified CT is selected to minimize energy costs.

The specified CT is selected to minimize energy costs and changeable with the dynamic cycle of energy costs.

The dose of the treatment agent is calculated to meet a specified microbial disinfection target.

The dose of the treatment agent is calculated to meet a risk based disinfection target.

The dose of the treatment agent is calculated to meet a specified residual concentration.

The dose of the treatment agent is calculated to meet a risk based residual concentration.

The dose of the treatment agent is calculated to minimize the required concentration of a quenching agent.

The dose of the treatment agent is calculated to minimize the required concentration of a pre-treatment agent used upstream the process.

One or more pre-treatment agents are used to minimize the dose required in the process.

The dose is calculated to minimize the number of injection points.

The calculation of the dose of the treatment agent is integrated with microbial inactivation kinetics of the fluid treatment system.

The microbial inactivation kinetics of the fluid treatment system are entered based on historical data.

The microbial inactivation kinetics of the fluid treatment system are measured on-line.

The process which includes one or more additional treatment processes.

The additional treatment includes pretreatment process (es), integrated treatment processes, post-treatment process(es) or a combination of two or more of these.

The additional treatment is one or more of physical, mechanical, chemical, biological or a combination of treatment.

One or more of the additional treatment processes are microbial.

One or more of the additional treatment processes are water quality adjustments.

One or more of the additional treatment processes are quenching of the chemical agent.

One or more of the additional treatment processes are one or more of UV, chlorine, chloramine, chlorine dioxide, chlorite, ozone, peracetic acid, hydrogen peroxide, permanganate, performic acid, persulfate, filtration, ferric, membrane bio-reactor, membrane, Free nitrous acid, Solar, etc.

One or more of the additional treatment processes are filtration, settling, dissolved air flotation, oxidation, biological processes, etc.

One or more of the additional treatment processes are UV treatment.

The optimization of the dose of the treatment agent of is integrated with a UV treatment system.

the optimization of the dose of the treatment agent is integrated with the measured UV intensity of the UV Treatment process.

The optimization of the dose of the treatment agent is integrated with the measured or estimated UV dose.

The process is automatically controlled by a computer.

The computer uses a feed forward approach.

The feed forward approach comprises calculating the demand/decay model and adjusting concentration of the chemical agent or other fluid parameter (flow rate, disinfectant demand and decay, microbial inactivation kinetics, microbial concentration, temperature, pressure, etc.).

The computer uses a feedback control approach.

The computer uses a feedback control approach wherein the concentration of the treatment agent at the inlet is adjusted for error based on measurements downstream.

Accordingly in yet another one of its aspects, the present invention provides for a fluid system for predicting the dose of a treatment agent required to reduce the concentration of a target contaminant contained in a fluid residing in a fluid treatment zone, the system comprising; a fluid inlet, a fluid outlet and a fluid treatment zone between the fluid inlet and the fluid outlet, at least one injection point for the addition of a chemical agent to the fluid, one or more measurement points configured to measure a fluid property, a controller to cause one or more fluid treatment system parameters to be adjusted, a programmable logic device programed using a model to calculate the dose (optimal concentration) of the treatment agent based on the residence time distribution, demand/decay, and dose models for the fluid treatment system, the programmable logic device outputting the calculated optimal concentration of the treatment agent to the controller which in response adjusts the concentration of the treatment agent at the at least one injection point or one or more fluid parameters to achieve the dose of the treatment agent.

Embodiments of this aspect of the invention any of the following features, alone or in any combination:

The calculation of dose is continuous.

The calculation of dose is discrete.

The calculation of dose is in real-time.

The fluid treatment zone is a batch reactor.

The fluid treatment zone is a continuous flow reactor.

The fluid treatment zone is an arbitrary flow reactor.

The fluid treatment zone is a semi-batch or semi-continuous flow reactor.

The fluid treatment zone is a contact channel.

The fluid treatment zone is a pipe or a tube or a plurality of them connected in series and/or in parallel.

The fluid treatment zone is a pre-existing volume allowing the fluid additional residence time or contact time (i.e., a discharge pipe, secondary clarifier, primary clarifier, interconnecting civil works, side streams, etc.).

The fluid is a vapor.

The fluid is a gas.

The fluid is a liquid (e.g., a solution, a slurry, a colloidal suspension and the like).

The fluid is contains an entrained solid (granular medium, etc.).

The fluid is an aqueous liquid.

The fluid is selected from the group consisting of groundwater, leachate, wastewater, sewer water, black-water, graywater, bilge water, ballast water, feed water, process water, industrial water, irrigation water, recreational water, pond water, lake water, creek water, river water, rain water, runoff water, pool water, cooling water, non-potable water, surface water, potable water, drinking water, semi-pure water, spent ultrapure water, produced water and any mixture of two or more of these.

The contaminant is a biological, chemical or physical compound.

The contaminant is an organism.

The contaminant is a more micro-organism.

The contaminant is a chemical compound.

The contaminant is a chemical compound selected from the group including: personal care products, pesticides, pharmaceutical compounds, chemical oxygen demand, biochemical oxygen demand, nitrogen compound, phosphorus compounds, potassium compounds, sulfur compounds, etc. or any combination thereof.

The contaminant consists of one or more chemical compounds or one or more biological constituents a combination of both.

The treatment agent is physical, mechanical, biological, chemical or any combination thereof The chemical treatment agent is selected from the group consisting of peracetic acid, chlorine, chloramine, chlorine dioxide, chlorite, ozone, performic acid, permanganate, persulfate, hydrogen peroxide, fenton reagents, ferric and/or ferrous based compounds, alum based compounds, polymer coagulants and flocculants, free nitrous acid, and any combination thereof.

At least one fluid property is measured.

The at least one fluid property is selected from the group consisting of fluid flow rate, concentration of a chemical agent, electrical conductivity, total organic carbon (TOC), concentration of solids in the fluid, Ultra-violet light transmittance (UVT), particle size distribution, turbidity, pH, temperature, redox agent, dissolved oxygen, FTIR, UV-Vis spectrometer, or any combination thereof.

The fluid property is measured online in real-time.

The fluid property is measured at discrete time intervals.

The fluid property is measured in one or more positions in the treatment system.

Chemical concentration is measured at one or more positions in the system.

Water quality parameters are measured at one or more positions in the system.

The treatment agent injection point is in close proximity to the fluid inlet.

A measurement device is located upstream of the injection point.

A measurement device is located downstream of the injection point.

A measurement device is located according to the signal-to-noise ratio of the measured parameter.

A measurement device is located in an optimal location for the control of disinfection dose and residual concentration in any point of the reactor.

A measurement device is located 1-15 feet downstream of the injection point.

A measurement device is located 3-5 feet downstream of the injection point.

A measurement device is located according to the fluid properties (disinfectant demand, decay, etc.) to give a reading comprised between the maximum and minimum range of the measurement probe.

A measurement device is located at a position downstream of the injection point that is empirically selected to optimize the calculation of the concentration of the chemical agent.

A second measurement device is disposed downstream of the injection point and a first measurement device.

The second measurement device is located at a position empirically selected to optimize the calculation of the concentration of the chemical agent.

The controller and the programmable logic device are separate.

The controller and the programmable logic device are co-located.

Accordingly in yet another one of its aspects, the present invention provides for a device for calculating the dose of a chemical a chemical agent for the treatment of a fluid comprising a contaminant, the device comprising, a fluid inlet and a fluid outlet with a reaction vessel between the fluid inlet and the fluid outlet, at least one injection point for the addition of a chemical agent to the fluid, one or more measurement devices configured to measure a fluid property, a programmable logic device programed with a model to calculate the dose (optimal concentration) of the chemical agent based on the residence time distribution, demand/decay, and chemical dose models for a fluid treatment system.

Embodiments of this aspect of the invention any of the following features, alone or in any combination:

The reaction vessel is a batch reactor

The reaction vessel contains a mixing device

The reaction vessel is a continuous flow path

The reaction vessel is a semi-batch or semi-continuous flow path

The reaction vessel is configured to supply samples to the measurement device from one or more positions located on the continuous flow path.

The fluid stream is heated, cooled, pressurized, or otherwise treated.

The device where the reaction vessel is configured to supply samples to the measurement device from one or more positions located on the continuous flow path.

The programmable logic controller is programmed to inject a predetermined concentration of the chemical agent into the fluid.

The programmable logic controller is programmed to measure a fluid property one or more times over a predetermined time period.

The programmable logic controller is programmed to measure a fluid property one or more times from one or more positions over a predetermined time period.

The programmable logic controller uses the measured fluid properties to calculate the dose of the treatment agent based on the programmed models for RTD, demand/decay and dose.

Accordingly in yet another one of its aspects, the present invention provides for a fluid treatment system including an dose calculation device.

Accordingly in yet another one of its aspects, the present invention provides for a water treatment system including an dose calculation device.

Accordingly in yet another one of its aspects, the present invention provides for a water disinfection system comprising an dose calculation device.

BRIEF DESCRIPTION OF THE DRAWINGS

Embodiments of the present invention will be described with reference to the accompanying drawings, wherein like reference numerals denote like parts, and in which:

FIG. 1: Example of microbial response in wastewater.

FIG. 2: An example of PAA decay in a wastewater sample.

FIG. 3: "Smart Box" for estimating demand/decay.

FIG. 4: Disinfectant probe locations in a contact chamber.

FIG. 5: Diurnal flow pattern.

FIG. 6: PAA Usage and Microbial Disinfection Performance for the Primary Wastewater Demand/Decay Parameters. Total PAA usage ratio of the Simple Control to the Advanced Control=1.51.

FIG. 7: PAA Usage and Microbial Disinfection Performance for the Secondary Wastewater Demand/Decay Parameters. Total PAA usage ratio of the Simple Control to the Advanced Control=1.0.

FIG. 8: PAA Usage and Microbial Disinfection Performance for the Primary Wastewater Demand/decay Parameters with UV Disinfection. Total PAA usage ratio of the Simple Control to the Advanced Control=1.13.

FIG. 9: Sample plot of the residual PAA concentration over time.

FIG. 10: A sample plot of the viable fecal coliforms as a function of ICT.

FIG. 11: A sample plot of RTD of particles through the system.

FIG. 12: A schematic of the plant installation.

DETAILED DESCRIPTION OF THE PREFERRED EMBODIMENTS

An important aspect of the current invention is the use of the residence time distribution (RTD) to estimate the system performance. In the simplest case, the RTD can be considered a Dirac delta function, as would be the case of purely plug flow—an assumption that has been made in the prior art discussed above. Alternatively, the RTD can be estimated using models of the system by utilizing numerical methods such as computational fluid dynamics (CFD). Alternatively, the RTD can be measured online through the use of appropriate tracers. In this latter case, the measured RTD could be done on a continuous basis, or an RTD can be estimated through experiments done periodically (especially at startup). However, in the current embodiment, the RTD is estimated using the following equation:

$$p = \frac{(x+tu)e^{-\frac{(x-tu)^2}{4Dt}}}{4\sqrt{\pi D t^3}}, \tag{14}$$

where x is the axial location within the reactor, D is the reactor dispersion and u is the average flow velocity. Equation (14) represents a standard form for the RTD when only axial dispersion is considered within a reactor. The unknown parameter D can be estimated, for example, based on online measurement or through CFD simulations.

Another key aspect of the invention is the prediction of the demand/decay of the treatment agent online, in real time. In one preferred embodiment, peracetic acid (PAA) is the chemical of choice for use in disinfection. One way to measure PAA demand/decay is through the use of a "Smart Box" as shown in FIG. 3. The Smart Box consists of a feed water hose drawn from the head of the disinfection system (contact chamber) that feeds a small reservoir within the Smart Box. The reservoir is mixed by stirring device and treatment agent injection (PAA in this case) is available. The reservoir can be flushed and drained back to the disinfection system (contact chamber) or can be drained to an analyzer (PAA meter). The procedure for estimating treatment agent decay is as follows:
1) The reservoir is filled with feed water.
2) A stirrer is activated to ensure good mixing in the reservoir.
3) Once the reservoir is full, the treatment agent is added to the reservoir at a known concentration.
4) A small amount of reservoir feed water (with treatment agent) is sampled on a periodic basis and the concentration of the treatment agent is measured with the analyzer (e.g., PAA meter).
5) The demand/decay of the treatment agent as a function of time for the feed water is thus determined (if needed, parameters can be fit to a given demand/decay model to match the measured demand/decay).
6) The system is flushed clean with feed water for a short period of time to flush out all residual disinfectant.
7) The procedure is repeated to update the demand/decay of the disinfectant for the new feed water.

It should be noted that variations in the design of the Smart box may consist of a contact chamber that has a continuous flow path, is a batch or semi-batch or semi continuous system. Alternatively, samples to the analyzer could be taken based on position in the reactor chamber or at specified time intervals. In yet another embodiment of the smart-box the feed water may be heated, pressurized, or otherwise treated.

Another way to measure disinfectant demand/decay is to place multiple concentration measurement probes close to the inlet of the disinfection system (contact chamber), as shown, for example, in FIG. 4. By assuming a demand/decay function and knowing the RTDs at the locations of the probes, it is possible to estimate the demand/decay of the disinfectant online.

In the present embodiment, two demand/decay models have been implemented. The first, is a double exponential, similar to what is used in disinfection, $$C = C_0((1-\alpha)e^{-k_{fD}t} + \alpha e^{-k_{sD}t}) \quad (15)$$

where C is the concentration of the disinfectant at time t, $C_0$ is the initial concentration and $\alpha \in [0,1]$, $k_{fD} \geq 0$ and $k_{sD} \geq 0$ are parameters that are estimated through fitting (discussed below). The second, simpler model has an initial demand component and then decay, $$C = C_0 \kappa e^{-k_D t} \quad (16)$$

where $\kappa \in [0,1]$ and $k_D \geq 0$ are parameters that can be determined by experiments. Equations (15) and (16) can be integrated with time to determine expressions for CT. For equation (15), $$CT(t) = \quad (17)$$

$$\int_0^t C dt = C_0 \frac{k_{sD}(\alpha-1)e^{-k_{fD}t} - k_{fD}\alpha e^{-k_{sD}t} + \alpha k_{fD} + (1-\alpha)k_{sD}}{k_{fD}k_{sD}}$$

and for equation (16)

$$CT(t) = C_0 \frac{\kappa(1 - e^{-k_D t})}{k_D}. \quad (18)$$

If equation (15) is utilized for the demand/decay model, then three probes are required for estimating the model parameters, whereas if equation (16) is utilized then two probes are required for the case depicted in FIG. 4. Given an estimate for the demand/decay parameters, at each probe location x equation (15) or (16) can be integrated with the RTD over time to estimate the expected probe concentration readings. For example, if the flow rate has been relatively steady and the contact chamber inlet concentration disinfectant has been held steady for a period of time T long enough that any disturbances measured by the two or three probes have decayed, then the estimated probe readings (using equation (15) in this case) at x can be calculated as:

$$C(x) = C_0 \int_0^T \frac{(x+tu)e^{-\frac{(x-tu)^2}{4Dt}}}{4\sqrt{\pi D t^3}} \left((1-\alpha)e^{-k_{fD}t} + \alpha e^{-k_{sD}t}\right) dt. \quad (19)$$

By minimizing the sum of the total squared error between each of the probe readings and concentration estimates from equation (19), numerical methods can be used to estimate the required parameters.

Different control strategies can be utilized (e.g., PID control), but in the current methodology, feedforward model based control has been utilized. Clearly, the control algorithm likely needs to be enhanced to allow for some form of feedback in order to account for model error. The user specifies a CT setpoint $CT_{SP}$ based on the target CT at a given location within the reactor. Note that $CT_{SP}$ is in units of concentration times time (e.g., mg·min/L). At the given location (usually, one would associate this location with one of the online probe locations for effective feedback control) the RTD can be estimated using equation (14), such that:

$$RTD_v(t, x) = \frac{(x+tu)e^{-\frac{(x-tu)^2}{4Dt}}}{4\sqrt{\pi D t^3}}. \quad (20)$$

In the current implementation, equation (20) is solved in vector form so that for a given x, for a given time vector tv of length $N_{tv}$, $RTD_v$ is a vector also of the same length. Also, a CT vector of length $N_{tv}$ can also be determined, $$CT_v = CT(tv), \quad (21)$$

where CT(tv) is calculated using equation (17) or (18) with the estimated parameters discussed above. Then, the average CT is calculated as:

$$CT_{avg} = \text{trapz}(tv, RTD_v * CT_v). \quad (22)$$

where "trapz" function is the standard trapezoidal integration approximation and the * operator represents elemental multiplication of two vectors, i.e., for any vectors $v_i$, $v_1(j) = v_2(j)v_3(j)$.

The chemical dosing concentration at the inlet to the contact chamber can then be set to:

$$C_{0_{new}} = \hat{k} \frac{CT_{SP}}{CT_{avg}} \quad (23)$$

where in the current embodiment where feedback control has not yet been implemented, $\bar{k}$ is a constant. However, to add in a form of feedback control, k̂ could be adjusted dynamically based on concentration measurements within the reactor.

One aspect of the invention is utilizing chemical disinfection (as described above) with other forms of disinfection (i.e., physical disinfection, mechanical disinfection, and biological disinfection). In the preferred embodiment, UV disinfection can be used with chemical disinfection. The intent of the application is to supplement UV disinfection with chemical disinfection under more severe water quality conditions, or vice versa. The same strategy can be used to minimize undesired effects such as disinfection byproduct formation, energy and chemical consumption. Instead of having the UV sized for worst case UVT (UV transmittance) and flow rate, the UV system can be sized for nominal conditions and PAA (or other chemical treatment) can be used as supplementary disinfection for situations when more severe conditions occur. Ultimately, the UV sizing can be reduced, leading to an overall reduction in total costs of the system for the end user. The opposite is also possible, i.e., PAA is sized for nominal conditions and UV is turned on for supplementary disinfection.

Estimated System Performance

A simulation model was developed to test the efficacy of the invention. Experimental data used for the simulations and the simulation results are presented in the following subsections.

EXPERIMENTAL DATA

An experimental study was undertaken to estimate PAA demand/decay at a single wastewater treatment plant.

Table 1 provides the parameters fitted to equation (15) for primary wastewater and Table 2 provides the parameters for secondary wastewater.

TABLE 1

Demand/decay fitted parameters using equation (15) for primary wastewater.

| Date | Alpha | Kf | Ks |
|---|---|---|---|
| 18 Nov. 2014 | 0.28 | 2.9 | 0.0067 |
| 20 Nov. 2014 | 0.29 | 4.4 | 0.014 |
| 24 Nov. 2014 | 0.77 | 30 | 0.017 |
| 25 Nov. 2014 | 0.8 | 31 | 0.026 |
| 2 Dec. 2014 | 0.48 | 2.4 | 0.022 |
| 4 Dec. 2014 | 0.49 | 2.3 | 0.022 |

TABLE 2

Demand/decay fitted parameters using equation (15) for secondary wastewater.

| Date | Alpha | Kf | Ks |
|---|---|---|---|
| 18 Nov. 2014 | 0.74 | 42 | 0.0099 |
| 20 Nov. 2014 | 0.87 | 42 | 0.0098 |
| 24 Nov. 2014 | 0.86 | 28 | 0.0096 |
| 25 Nov. 2014 | 0.99 | 40 | 0.014 |
| 2 Dec. 2014 | 0.83 | 44 | 0.0097 |
| 4 Dec. 2014 | 0.95 | 34 | 0.015 |

Simulations were run using first the primary wastewater demand/decay parameters, then the secondary ones. A diurnal flow pattern, as shown in FIG. 5 was used in the simulations. The microbial disinfection parameters were held steady based on the values provided in Table 3.

TABLE 3

Microbial disinfection parameters.

| N0 | Beta | Kf (1/min) | Ks (1/min) |
|---|---|---|---|
| 1.00E+05 | 0.006 | 0.27 | 0.04 |

Simulation Results

Some example results of the simulations are presented in this section. The "Advanced Control" results are based on the methodology presented above utilizing the three probe PAA demand/decay estimation methodology. The "Simple Control" results are based on simple flow pacing where the PAA initial concentration is adjusted to maintain a steady inlet concentration, adjusted for flow rate changes.

The simulation results for the case of primary wastewater PAA demand are presented in FIG. 6. The figure on the left shows the PAA concentration using the Simple Control and Advanced Control, while the figure on the right shows the overall microbial disinfection performance, both as functions of time. As can be seen, the Advanced Control used much less PAA, and was able to better control the overall microbial disinfection performance. For this case, the ratio of the Simple Control to the Advanced Control PAA usage was 1.51. Similar to in FIG. 6, the simulation results for the case of secondary wastewater PAA demand are presented in FIG. 7. As can be seen, because the demand/decay variations for PAA are less for the secondary effluent, the PAA usage was similar for both control methods. In fact, for this case, the ratio of the Simple Control to the Advanced Control PAA usage was 1.0. The results for the case where UV disinfection was supplemented with PAA are presented in FIG. 8. As can be seen, PAA was only required at a specific time. The performance of the two control strategies was similar and the ratio of the Simple Control to the Advanced Control PAA usage was 1.13.

The following description is a non-limiting example of implementation of the process defined by claim 2 of the present application. This non-limiting example should not be used to limit or construe the scope of the invention defined by the claims.

A process to optimize the dose of a treatment agent for reduction of a contaminant in a fluid, the process comprising:

a. Calculating the residence time distribution model (RTD) for the treatment system.

The RTD can be determined by the following methods:

Completely assumed.

Through an equation, or a vector of values, that is generated using CFD or another numerical approximation method.

Knowing the geometry (length, width, depth) and configuration (e.g., serperntine, straight, baffle locations, weir locations, etc.) of the contact basin, use CFD to determine the hydraulic profile and particle track, thus yielding an RTD, at a specific flowrate. This RTD function can be scaled with flowrate.

Through an equation, or a vector of values, that is empirically generated.

Perform a tracer test on the contact basin (inject a chemical into the water and measure its concentration at points in the contact basin over time and space) and use experimental results to generate an RTD for the system. This RTD function can be scaled with flowrate.

b. Calculating one or more demand/decay models for the treatment system.

The demand/decay model can be determined by the following methods:

Completely assumed.

Through an equation, or a vector of values, that is generated empirically.

Obtain a water sample and perform a batch test to monitor chemical decomposition of over time. Chemical is spiked to an aliquot of water in a beaker and the residual concentration is measured over time. The data is fitted with a first-order decay model.

Through online measurements.

One or more probes are placed into the plant's chemical contact basin. Chemical is spiked upstream of the contact basin. Using one of more online probes for chemical residual measurement, the water flowrate, and known amount of chemical added, the decomposition profile of the chemical is determined. The decomposition of chemical is a function of probe position, and thus time, in the contact basin.

Through correlations with water quality parameter.

In batch tests, identify correlations between water quality and chemical decomposition. Then, use online probes for UVT, turbidity, pH, particle count, organics, TSS, inorganics, etc. and previously determined correlations between water quality parameter and demand/decay.

c. Calculating the dose model using the calculated RTD model from step (a) and the demand/decay model from step (b).

The dose model can be determined by the following methods:

Completely assumed.

Through an equation, or a vector of values, that is generated empirically.

Obtain a water sample and perform a batch test to contaminant removal over time. Measure the initial concentration of the contaminant. Then add chemical at a known amount and measure both the chemical residual and contaminant concentration over time. The contaminant degradation data is fitted with a model thus yield a dose model. The dose model considers both the chemical demand/decay model along with the RTD model.

Through online measurements.

Using one of more online probes for contaminant measurement, the water flowrate, and known amount of chemical added, the contaminant degradation profile is determined. The contaminant removal as a function of probe position, and thus time, in a contact basin.

Through correlations with water quality parameters.

In batch tests, identify correlations between water quality and contaminant degradation. Then, use online probes for UVT, turbidity, pH, particle count, organics, TSS, inorganics, etc. and previously determined correlations between water quality parameter and contaminant removal.

d. Calculating the dose of the treatment agent within the system using the dose model from step (c).

The dose of the treatment agent is determined with the following inputs:

The RTD model

The demand/decay model

The dose model

Instantaneous plant flowrate.

As an example, first using the dose model, a required dose (e.g., the CT dose) is determined based on the extent disinfection required. For example, using the dose model, a CT dose of 10 mg min/L is required to achieve a 3 log inactivation of E. coli.

Now the system dose setpoint is defined as 10 mg min/L. Then using the demand/decay model, RTD model, and instantaneous flow rate, a PLC calculates the required chemical dose concentration required at the onset of the contact basin. Probes for chemical residual, contaminant concentration, or water quality parameters are used online to "fine tune" the PLC as well as "train" the models for changes in the system that occur over time.

e. Contacting the fluid with the treatment agent in the concentration required to meet the dose calculated in step (d).

As an example, a chemical dosing pump is used to meter in a chemical at a defined rate (determined by the PLC) at the onset of the chemical contact basin. A static mixer is placed immediately downstream of the injection point to ensure complete mixing.

Following is one non-limiting example of how the steps would be implemented.

A plant is looking to implement disinfection of their wastewater secondary effluent using peracetic acid. The plant has a disinfection target of 200 cfu/100 mL of fecal coliforms. The plant has an existing chemical contact basin that was designed for disinfection with chlorine.

Step 1:

Collect 9 secondary effluent wastewater samples, collected every 8 hours over a period of 3 days and send to Trojan lab.

Step 2:

Perform routine wastewater characterization analyses such as TSS, COD, BOD, UVT, and ammonia.

Step 3:

Perform the below on each of the 9 samples.

Spike an aliquot of water with peracetic acid to a known concentration. Measure the residual concentration over time. Also collect samples, quench the PAA residucal with sodium thiosulfate and enumerate the viable fecal coliforms.

Plot the residual PAA concentration over time. Fit the data using a first order decay model and obtain the demand (D) and decay (k) model parameters. This is the demand/decay model. Determine the integral CT (ICT) by integrating the demand/decay model with respect to time. The following equation may be used:

See FIG. 9 for a sample plot of the residual PAA concentration over time.

Plot the viable fecal coliforms as a function of ICT. Fit the data using a two term Chick-Watson disinfection model and obtain the model parameters. This is the dose (disinfection) model. Determine the required ICT. The following equation may be used.

See FIG. 10 for a sample plot of the viable fecal coliforms as a function of ICT.

Knowing that the disinfection limit is 100 cfu/100 mL, a ICT of 125 mg min/L is selected as the design ICT dose.

Step 4:

Obtain the height, width, and length of the plant's chemical contact basin. Prepare a scale model in a computational fluid dynamics software package. Generate a particle track, at the plant's average daily flow rate. Determine the Residence Time Distribution (RTD) of particles through the system. This RTD function can be scaled with the plant's variable flowrates. A sample plot of RTD of particles through the system is illustrated in FIG. 11.

The RTD model, CFD model, dose model, and demand/decay model can be incorporated to simulate the full-scale process as illustrated below.

Step 5:

Program a PLC with Trojan's control algorithm that incorporates the above determined demand/decay model, dose (disinfection) model, and RTD model.

Step 6:

Install PLC, PAA dosing pump, PAA chemical storage, mixers, water flow meter, and PAA residual probes at the plant. FIG. 12 illustrates is a schematic of the plant installation.

Step 7:

Control the chemical disinfection process to administer a set point dose, as a function of plant flow rate and water quality.

WORKS CITED

Amini, R., Taghipour, R. & Mirgolbabaei, H., 2011. Numerical assessment of hydrodynamic characteristics in chlorine contact tank. *International Journal for Numerical Methods in Fluids*, Issue 67, pp. 885-898.

Angeloudis, A., Stoesser, T., Falconer, R. A. & Kim, D., 2015. Flow, transport and disinfection performance in small- and full-scale contact tanks. *Journal of Hydro-environmental Research*, pp. 15-27.

Bellamy, W. D., Finch, G. R. & Haas, C. N., 1998. *Integrated Disinfection Design Framework*, s.l.: AWWA Research Foundation and American Water Works Association.

Chien, I.-l., Peng, S. C. & Liu, J. H., 2002. Simple control method for integrating processes with long deadtime. *Journal of Process Control*, pp. 391-404.

Demir, F. & Woo, W. W., 2014. Feedback control over the chlorine disinfection process at a wastewater treatment plant using a Smith predictor, a method of characteristics and odometric transformation. *Journal of Environmental Chemical Engineering*, pp. 1088-1097.

Hassen, A., 2000. Inactivation of indicator bacteria in wastewater by chlorine—a kinetics study. *Biosource Technology, Issue* 72, pp. 85-93.

Khan, L. A., Wicklein, E. A. & Teixeira, E., 2006. Validation of a Three-Dimensional Computational Fluid Dynamics Model of a Contact Tank. *Journal of Hydraulic Engineering*, Issue 132, pp. 741-746.

Kim, D.-I., Fortner, J. & Kim, J.-H., 2007. A Multi-Channel Stopped-Flow Reactor for Measuring Ozone Decay Rate: Instrument Development and Application. *Ozone: Science and Engineering*, Issue 29, p. 121-129.

Koivunen, J. & Heinonen-Tanski, H., 2005. Peracetic acid (PAA) disinfection of primary, secondary and tertiary treated municipal wastewaters. *Water Research*, Issue 39, pp. 4445-4453.

Lawryshyn, Y. & Cairns, B., 2003. UV disinfection of water: the need for UV reactor validation. *Water Science and Technology: Water Supply*, pp. 293-300.

Levenspiel, O., 1972. *Chemical Reaction Engineering*. 2nd ed. New York: John Wiley and Sons.

Mezzanotte, V., 2003. Secondary effluent disinfection by peracetic acid (PAA) microrganism inactivation and regrwoth, preliminary results. *Water Science and Technology: Water Supply*, 3(4), pp. 269-275.

Muslim, A., Li, Q. & Tade, M. O., 2009. Modelling of Chlorine Contact Tank and the Combined Applications of Linear Model Predictive Control and Computational Fluid Dynamics. *Chemical Product and Process Modeling*, pp. 28-47.

Rauen, W. B., Angeloudis, A. & Falconer, R. A., 2012. Appraisal of chlorine contact tank modelling practices. *Water Research*, Issue 46, pp. 5834-5847.

Rauen, W. B., Lin, B., Falconer, R. A. & Teixeira, E. C., 2008. CFD and experimental model studies for water disinfection tanks with low Reynolds number flows. *Chemical Engineering Journal*, Issue 137, pp. 550-560.

Shen, W., Chen, X., Pons, M. & Corriou, J., 2009. Model predictive control for wastewater treatment process with feedforward compensation. *Chemical Engineering Journal*, pp. 161-174.

Shiono, K. & Teixeira, E., 2000. Turbulent characteristics in a baffled contact tank. *Journal of Hydraulic Research*, pp. 403-416.

Sohn, J., et al., 2004. Disinfectant decay and disinfection by-products formation model development: chlorination and ozonation by-products. *Water Research*, Issue 38, pp. 2461-2478.

Zhang, J., et al., 2011. Modeling and Simulations of Flow Pattern, Chlorine Concentration, and Mean Age Distributions in Potable Water Service Reservoir of Singapore. *Journal of Environmental Engineering*, Issue 137, pp. 575-584.

What is claimed is:

1. A process to optimize the dose of a treatment agent for the treatment of a fluid comprising a contaminant, the process comprising;
    (a) calculating the dose of the treatment agent based on the relationship between concentration of the treatment agent at one or more points and residence time distribution of the treatment system, wherein the residence time distribution is based at least in part upon an amount of time the fluid resides in a reactor;
    (b) obtaining at least one fluid property; and
    (c) contacting the fluid with the treatment agent in the concentration required to meet the dose of the treatment agent calculated in step (a), wherein the contacting is based at least in part upon a feedforward model based control and utilizing the at least one fluid property and the calculated the dose of treatment agent.

2. The process in claim 1, wherein the contaminant is a biological, chemical, or physical compound.

3. The process in claim 1, wherein the contaminant is a chemical compound selected from the group consisting of personal care products, pesticides, pharmaceutical compounds, nutrient compounds, chemical oxygen demanding compounds, biochemical oxygen demanding compounds, nitrogen compound, phosphorus compounds, potassium compounds, sulfur compounds, and any combination thereof.

4. The process in claim 1, wherein the treatment agent is physical, mechanical, biological, chemical or any combination thereof.

5. The process in claim 1, wherein the chemical treatment agent is selected from the group consisting of peracetic acid (PAA), chlorine, chloramine, chlorine dioxide, chlorite, ozone, performic acid, permanganate, persulfate, hydrogen peroxide, fenton reagents, ferric and/or ferrous based compounds, alum based compounds, polymer coagulants and flocculants, free nitrous acid, and any combination thereof.

6. The process in claim 1, wherein the at least one fluid property is selected from the group consisting of fluid flow rate, concentration of a chemical agent, electrical conductivity, total organic carbon (TOC), concentration of solids in the fluid, Ultra-violet light transmittance (UVT), particle size distribution, total suspended solids, turbidity, pH, temperature, redox agent, dissolved oxygen, ionic chromatography, FTIR, UV-Vis spectrometer, or any combination thereof.

7. The process in claim 1, wherein the calculation of the dose of the treatment agent is integrated with microbial inactivation kinetics of the fluid treatment system.

8. The process in claim 1, which includes one or more additional treatment processes.

9. The process in claim 1 wherein the optimization of the dose of the treatment agent of is integrated with a UV treatment system.

10. The process in claim 1 wherein the process is automatically controlled by a computer.

11. A process to optimize the dose of a treatment agent for reduction of a contaminant in a fluid, the process comprising:
  (a) calculating the residence time distribution model (RTD) for the treatment system, wherein the residence time distribution model is based at least in part upon an amount of time the fluid resides in a reactor;
  (b) calculating one or more demand/decay models for the treatment system;
  (c) calculating the dose model using the calculated RTD model from step (a) and the demand/decay model from step (b);
  (d) calculating the dose of the treatment agent within the system using the dose model from step (c);
  (e) obtaining at least one fluid property; and
  (f) contacting the fluid with the treatment agent in the concentration required to meet the dose of the treatment agent calculated in step (d), wherein the contacting is based at least in part upon a feedforward model based control and utilizing the at least one fluid property and the calculated the dose of treatment agent.

12. The process in step (a) of claim 11, wherein the RTD model is assumed.

13. The process in step (a) of claim 11, wherein the RTD is based on an analytically generated equation.

14. The process in step (a) of claim 11, wherein the RTD is based on an empirically generated equation.

15. The process in step (a) of claim 11, wherein the RTD is based on one or more of the following equations where x is a position within the treatment system measured as the average linear distance from the inlet (where chemical dosing is taking place) to the position where the RTD is being calculated, t is the time, u is the (average) velocity, V is the volume of fluid within the reactor from the inlet to location x, Q is the flow rate, D is a parameter based on experimental or numerical measurements or is estimated:

$$RTD = \frac{V}{Q}$$

or $$RTD = \frac{(x+tu)e^{-\frac{(x-tu)^2}{4Dt}}}{4\sqrt{\pi D t^3}}.$$

16. The process in step (b) of claim 11, wherein the demand/decay is measured online.

17. The process in step (b) of claim 11, wherein the demand/decay model is based on one or more fluid parameters.

18. The process in step (b) of claim 11, wherein the demand/decay model is based one or more of the following equations:

$$\frac{C}{C_0} = (1-\alpha)e^{-k_{f_D}t} + \alpha e^{-k_{s_D}t}$$

where C is the concentration of the disinfectant at time t, $C_0$ is the initial concentration and $\alpha \in [0,1]$, $k_{f_D} \geq 0$ and $k_{s_D} \geq 0$ are parameters that can be determined by experiments;

$$\frac{C}{C_0} = \kappa e^{-k_D t}$$

where $\kappa \in [0,1]$, and $k_D \geq 0$ are parameters that can be determined by experiments.

19. The process in step (c) of claim 11, wherein the dose model is generated by an analytical model.

20. The process in step (c) of claim 11, wherein the dose model is generated by computational fluid dynamics or other numerical approximation method.

21. The process in step (c) of claim 11, wherein the dose model is created by integrating the demand/decay model with the RTD model.

* * * * *